(12) United States Patent
Fell et al.

(10) Patent No.: US 11,249,106 B2
(45) Date of Patent: Feb. 15, 2022

(54) METHODS FOR CLOSED LOOP OPERATION OF CAPACITIVE ACCELEROMETERS

(71) Applicant: Atlantic Inertial Systems UK, Plymouth (GB)

(72) Inventors: Christopher Paul Fell, Cheltenham (GB); Kevin Townsend, Liskeard (GB)

(73) Assignee: ATLANTIC INERTIAL SYSTEMS UK, Plymouth (GB)

( * ) Notice: Subject to any disclaimer, the term of this patent is extended or adjusted under 35 U.S.C. 154(b) by 0 days.

(21) Appl. No.: 17/082,324

(22) Filed: Oct. 28, 2020

(65) Prior Publication Data

US 2021/0132105 A1    May 6, 2021

(30) Foreign Application Priority Data

Nov. 1, 2019  (GB) ..................... 1915903

(51) Int. Cl.
  *G01P 15/125*  (2006.01)
  *G01P 1/00*  (2006.01)

(52) U.S. Cl.
  CPC .............. *G01P 15/125* (2013.01); *G01P 1/00* (2013.01)

(58) Field of Classification Search
  CPC ..................................... G01P 15/125
  USPC .................................... 73/514.32
  See application file for complete search history.

(56) References Cited

U.S. PATENT DOCUMENTS

| | | | |
|---|---|---|---|
| 6,631,643 B2 | 10/2003 | Malvern et al. |
| 6,761,069 B2 | 7/2004 | Hollocher et al. |
| 7,267,006 B2 | 9/2007 | Malvern |
| 7,552,637 B2 | 6/2009 | Werking |
| 2006/0150735 A1 | 7/2006 | Fax et al. |

(Continued)

FOREIGN PATENT DOCUMENTS

| | | |
|---|---|---|
| EP | 0338688 B1 | 10/1989 |
| WO | 2004076340 A1 | 9/2004 |

OTHER PUBLICATIONS

IPO Search Report for International Application No. GB1915903.7 dated Jul. 17, 2020, 3 pages.

*Primary Examiner* — Walter L Lindsay, Jr.
*Assistant Examiner* — Philipmarcus T Fadul
(74) *Attorney, Agent, or Firm* — Cantor Colburn LLP

(57) ABSTRACT

A method for closed loop operation of a capacitive accelerometer includes applying a first drive signal $V_1$ to a first fixed capacitive electrode and a second drive signal $V_2$ to a second fixed capacitive electrode the first and second drive signals each having a periodic waveform varying in amplitude between zero and a maximum value $V_{ref}$ and sensing a displacement of the proof mass and applying pulse width modulation to the first and second drive signals with a constant frequency $f_{mod}$ and a variable mark/space ratio. The method also includes applying a voltage offset $V_{ref}/2$ to the proof mass and applying the pulse width modulation such that the first and second drive signals have a waveform that varies so that when either one of the first and second drive signals is at $V_{ref}$ or zero the other drive voltage is at $V_{ref}/2$.

20 Claims, 14 Drawing Sheets

(56) References Cited

U.S. PATENT DOCUMENTS

| | | |
|---|---|---|
| 2013/0055813 A1 | 3/2013 | Bicknell et al. |
| 2017/0146562 A1* | 5/2017 | Durston ................ G01P 15/131 |
| 2017/0153267 A1 | 6/2017 | Townsend et al. |
| 2018/0128851 A1* | 5/2018 | Malvern ................ G01P 15/11 |
| 2018/0217179 A1* | 8/2018 | Harish ................ G01P 15/131 |

* cited by examiner

METHODS FOR CLOSED LOOP OPERATION OF CAPACITIVE ACCELEROMETERS

FOREIGN PRIORITY

This application claims priority to Great Britain Patent Application No. 1915903.7 filed Nov. 1, 2019, the entire contents of which is incorporated herein by reference.

TECHNICAL FIELD

The present disclosure relates to capacitive accelerometers and their control schemes, and in particular to improved methods for closed loop operation of capacitive accelerometers.

BACKGROUND

Accelerometers are electromechanical devices that are widely used to measure acceleration forces due to motion and/or vibration. Capacitive accelerometers may find use in applications including seismic sensing, vibration sensing, inertial sensing and tilt sensing. Capacitive accelerometers are typically implemented as micro electromechanical systems (MEMS) and may be manufactured from a semiconductor material such as silicon. A typical MEMS sensing structure for a capacitive accelerometer comprises a proof mass moveably mounted to a support, with a set of electrode fingers extending from the proof mass being interdigitated with one or more sets of fixed electrode fingers so as to form a differential capacitor. The electrodes of the sensing structure are connected to suitable drive and pickoff electronics.

In an open loop configuration, the electronics are arranged to drive the fixed electrode fingers with any suitable waveform, which may be sine or square wave signals, such that when the proof mass moves under acceleration a pickoff voltage signal appears on the output. WO 2004/076340 provides an example of an open loop accelerometer. In the open loop configuration, the AC signal detected on the proof mass can be used to generate a signal indicative of the applied acceleration. The amplitude of the detected signal on the proof mass from a single fixed electrode will vary $\propto V/d^2$, where V is the differential voltage between the electrode and proof mass, and d is the gap size. The signal level will therefore vary quadratically with the gap, which varies linearly with applied acceleration. This gives a non-linear scale factor which must subsequently be corrected in order to achieve high performance. The vibration rectification error may be large due to the non-linear signal response. Also, the small gap size (typically a few microns) limits the motion and hence the operational dynamic range of the device. Open loop accelerometers can have limited performance in terms of bandwidth, linearity and dynamic range.

An accelerometer sensing structure designed for open loop operation can also be used in a closed loop configuration by using drive electronics to provide a variable electrostatic force to the electrodes to achieve force balancing. In a closed loop mode, the proof mass is maintained in a fixed position at all times by the application of electrostatic forces. The output is then given by the applied force. U.S. Pat. No. 7,267,006 provides an example of a closed loop electronic control scheme using pulse width modulation (PWM) of the drive signals. In such a closed loop configuration, the electronics are arranged to drive pairs of the fixed electrode fingers with in-phase and anti-phase AC square wave voltage signals. The drive signals have a waveform varying in amplitude between zero and a maximum value $V_{ref}$, which is typically 30 V in order to give the force required to achieve a 70 g dynamic range. The mark:space ratio of the PWM drive scheme can be adjusted, depending on the applied acceleration, to change the average DC voltage of each drive signal and hence the feedback force. The mark:space ratio can therefore be used to generate an output signal which varies linearly with the applied acceleration level. This design has been demonstrated to give high dynamic range, good linearity, high bandwidth and low vibration rectification error.

A known problem which can degrade the performance of many capacitive sensors is dielectric charging which can occur in the presence of DC offset voltages. This effect involves the charging of thin dielectric layers on the electrode plate surfaces due to the migration of charged species (electrons and ions) in the presence of electrical field gradients. The high field gradients are present due to the differential voltage between the fixed and movable electrodes, which are particularly large for closed loop type accelerometers such as described in U.S. Pat. No. 7,267,006. The proof mass and electrode structures for this type of device are typically fabricated from bulk crystalline silicon using deep reactive ion etching techniques. Such techniques will typically produce a thin surface layer of native oxide on the electrode surfaces which grows naturally after the silicon surface is exposed by etching and prior to sealing of the device. Charged species, such as sodium and lithium, will be present due to the anodic bonding of upper and lower glass wafer layers which encapsulate the silicon proof mass and electrode structures. The build-up of these charges in the dielectric surface layers on the electrodes means that some of the voltage, $V_{ref}$, is dropped across the dielectric layer and the effective voltage in the gap, d, is changed. This will therefore cause a corresponding change in the transducer gain which will adversely affect the device performance.

Dielectric charging is known to cause slow shifts in both bias and scale factor under constant operating conditions. The slow nature of the charge migration means that the charges will not respond to high frequency AC voltage modulation but will migrate in the presence of fixed voltage gradients. These effects typically occur more rapidly at elevated temperatures where the ion mobility is increased, and will tend to reach a steady state over time. The charge will however dissipate once the voltage has been removed and the bias and scale factor shifts have been shown to relax back towards the original starting levels once the device is switched off. The effects will however recur when the device is subsequently powered on again. This represents a significant limitation on the performance capability of such devices.

It is an object of the present disclosure to overcome one or more of the disadvantages outlined above.

SUMMARY

According to a first aspect of this disclosure, there is provided a method for closed loop operation of a capacitive accelerometer. The accelerometer includes a proof mass moveable along a sensing axis in response to an applied acceleration, and first and second fixed capacitive electrodes arranged symmetrically either side of the proof mass along the sensing axis with a gap defined between each of the first and second fixed capacitive electrodes and the proof mass under zero applied acceleration. The method comprises: applying a first drive signal $V_1$ to the first fixed capacitive electrode and a second drive signal $V_2$ to the second fixed capacitive electrode, the first and second drive signals each having a periodic waveform varying in amplitude between zero and a maximum value $V_{ref}$; sensing a displacement of the proof mass and applying pulse width modulation to the first and second drive signals with a constant frequency $f_{mod}$ and a variable mark/space ratio so as to provide a net electrostatic restoring force on the proof mass for balancing the inertial force of the applied acceleration and maintaining the proof mass at a null position; applying a voltage offset $V_{ref}/2$ to the proof mass; and applying the pulse width modulation such that the first and second drive signals have a waveform that varies so that when either one of the first and second drive signals is at $V_{ref}$ or zero the other drive voltage is at $V_{ref}/2$.

As will be described further below, by offsetting the proof mass to $V_{ref}/2$, the first and second drive signals vary by $\pm V_{ref}/2$ relative to the proof mass and hence the problematic mean DC offset seen in the prior art is eliminated. The force varies as the square of the voltage so the polarity of the net electrostatic restoring force is unchanged. The first and second drive signals having a waveform that steps to $V_{ref}/2$ rather than being a mirror image, as in the prior art, ensures that the mean force can still be adjusted by varying the mark:space ratio of the pulse width modulation. Hence the inertial force of the applied acceleration can be balanced to maintain the proof mass at a null position. Methods as disclosed herein provide a modified closed loop scheme which substantially eliminates the effects of dielectric charging whilst maintaining high performance capability.

In at least some examples, the periodic waveform of the first and second drive signals may be substantially a square waveform, comprising a waveform sequence stepping to $V_{ref}/2$ when the other drive signal is at $V_{ref}$ or zero. In other examples, the first and second drive signals may comprise any other suitable waveform having such a sequence, for example triangular or trapezoidal waveforms instead of a square waveform. In other examples, the first and second drive signals may comprise a sine-based waveform. In some examples, a sine-based waveform sequence may comprise a half sine wave which alternates in sequence so that when either one of the first and second drive signals is varying between $V_{ref}/2$ and $V_{ref}$, or between $V_{ref}/2$ and zero, during the half sine wave portion, the other drive voltage is at $V_{ref}/2$.

Regardless of the waveform shape, the first and second drive signals have a particular waveform sequence. In some examples where the applied acceleration is zero, the second drive signal $V_2$ is a mirror image of the first drive signal $V_1$ with a quarter cycle shift. The quarter cycle shift ensures that the drive signal amplitude always rests at $V_{ref}/2$ for at least a quarter cycle before stepping up to $V_{ref}$ or stepping down to zero. This corresponds to a 50:50 mark:space ratio.

In one or more examples, in addition or alternatively, the first and second drive signals have a waveform that steps between $V_{ref}/2$ and $V_{ref}$ in a first half cycle and steps between $V_{ref}/2$ and zero in a second half cycle. This waveform sequence may apply regardless of the mark:space ratio.

In one or more examples, in addition or alternatively, the first and second drive signals have a waveform that comprises a single square wave pulse in the first half cycle and a single square wave pulse in the second half cycle that is inverted about $V_{ref}/2$ relative to the single square wave pulse in the first half cycle. This waveform sequence may apply regardless of the mark:space ratio.

In one or more examples, in addition or alternatively, applying a voltage offset $V_{ref}/2$ to the proof mass comprises referencing the proof mass to an electrical connection midway between the first and second sets of fixed capacitive electrode fingers.

In one or more examples, in addition or alternatively, the method further comprises: sensing a displacement of the proof mass by sampling an output signal at the proof mass; and adding a compensation signal to the output signal, the compensation signal having the same pulse width modulation with a constant frequency $f_{mod}$, and the compensation signal being in anti-phase with the output signal.

In addition, the method may further comprise: applying the compensation signal across a compensation capacitor having a capacitance substantially matched to the capacitance of the gap between each of the first and second fixed capacitive electrodes and the proof mass under zero applied acceleration. It will be appreciated that the gap between each of the first and second fixed capacitive electrodes and the proof mass, under zero applied acceleration, is ideally identical i.e. the proof mass is centrally located between the first and second fixed capacitive electrodes. Of course, manufacturing tolerances may cause a small deviation from such an ideal situation.

In one or more examples, in addition or alternatively, the method further comprises: outputting a signal indicative of the applied acceleration.

In one or more examples, in addition or alternatively, the capacitive accelerometer comprises a silicon MEMS structure.

In one or more examples, in addition or alternatively, the proof mass is substantially planar.

In one or more examples, in addition or alternatively, the proof mass is mounted to a fixed substrate by flexible support legs so as to be linearly moveable in a plane along the sensing axis in response to an applied acceleration, and wherein the first and second fixed capacitive electrodes are formed in the fixed substrate in the same plane.

In one or more examples, in addition or alternatively, the proof mass comprises first and second sets of moveable capacitive electrode fingers extending from the proof mass, substantially perpendicular to the sensing axis and spaced apart along the sensing axis; and the first and second fixed capacitive electrodes comprise, respectively, first and second sets of fixed capacitive electrode fingers extending substantially perpendicular to the sensing axis and spaced apart along the sensing axis; and the first set of fixed capacitive electrode fingers is arranged to interdigitate with the first set of moveable capacitive electrode fingers with a first offset in one direction along the sensing axis from a median line between adjacent fixed capacitive electrode fingers, and the second set of fixed capacitive electrode fingers is arranged to interdigitate with the second set of moveable capacitive electrode fingers with a second offset in the opposite direction along the sensing axis from a median line between adjacent fixed capacitive electrode fingers.

According to a second aspect of this disclosure, there is provided a capacitive accelerometer comprising: a proof mass moveable along a sensing axis in response to an applied acceleration; first and second fixed capacitive electrodes arranged symmetrically either side of the proof mass along the sensing axis with a gap defined between each of the first and second fixed capacitive electrodes and the proof mass under zero applied acceleration; a pulse width modulation signal generator arranged to apply a first drive signal $V_1$ to the first fixed capacitive electrode and a second drive signal $V_2$ to the second fixed capacitive electrode, the first and second drive signals each having a periodic waveform varying in amplitude between zero and a maximum value $V_{ref}$; and a closed loop circuit arranged to detect a signal resulting from displacement of the proof mass and control the pulse width modulation signal generator to apply the first and second drive signals at a constant frequency $f_{mod}$ with a variable mark/space ratio so as to provide a net electrostatic restoring force on the proof mass for balancing the inertial force of the applied acceleration and maintaining the proof mass at a null position; wherein a voltage offset $V_{ref}/2$ is applied to the proof mass; and wherein the first and second drive signals have a waveform that varies so that when either one of the first and second drive signals is at $V_{ref}$ or zero the other drive voltage is at $V_{ref}/2$.

In one or more examples, the proof mass is referenced to an electrical connection midway between the first and second fixed capacitive electrodes.

In one or more examples, in addition or alternatively, the capacitive accelerometer further comprises a pre-amplifier arranged to sample an output signal at the proof mass, wherein the pulse width modulation signal generator is arranged to input a compensation signal to the pre-amplifier for the pre-amplifier to add to the output signal, the compensation signal having the same pulse width modulation with a constant frequency $f_{mod}$, and the compensation signal being in anti-phase with the output signal.

In at least some examples, the capacitive accelerometer further comprises a compensation capacitor connected between the pulse width modulation signal generator and the pre-amplifier, the compensation capacitor having a capacitance substantially matched to the capacitance of the gap between each of the first and second fixed capacitive electrodes and the proof mass under zero applied acceleration.

In one or more examples, in addition or alternatively, the capacitive accelerometer comprises a silicon MEMS structure.

In one or more examples, in addition or alternatively, the proof mass is mounted to a fixed substrate by flexible support legs so as to be linearly moveable in a plane along the sensing axis in response to an applied acceleration, and wherein the first and second fixed capacitive electrodes are formed in the fixed substrate in the same plane.

In one or more examples, in addition or alternatively, the proof mass is substantially planar.

In one or more examples, in addition or alternatively, the proof mass comprises first and second sets of moveable capacitive electrode fingers extending from the proof mass, substantially perpendicular to the sensing axis and spaced apart along the sensing axis; and the first and second fixed capacitive electrodes comprise, respectively, first and second sets of fixed capacitive electrode fingers extending substantially perpendicular to the sensing axis and spaced apart along the sensing axis; and the first set of fixed capacitive electrode fingers is arranged to interdigitate with the first set of moveable capacitive electrode fingers with a first offset in one direction along the sensing axis from a median line between adjacent fixed capacitive electrode fingers, and the second set of fixed capacitive electrode fingers is arranged to interdigitate with the second set of moveable capacitive electrode fingers with a second offset in the opposite direction along the sensing axis from a median line between adjacent fixed capacitive electrode fingers.

BRIEF DESCRIPTION OF THE DRAWINGS

One or more non-limiting examples will now be described with reference to the accompanying drawings, in which.

DETAILED DESCRIPTION

Figure 1:
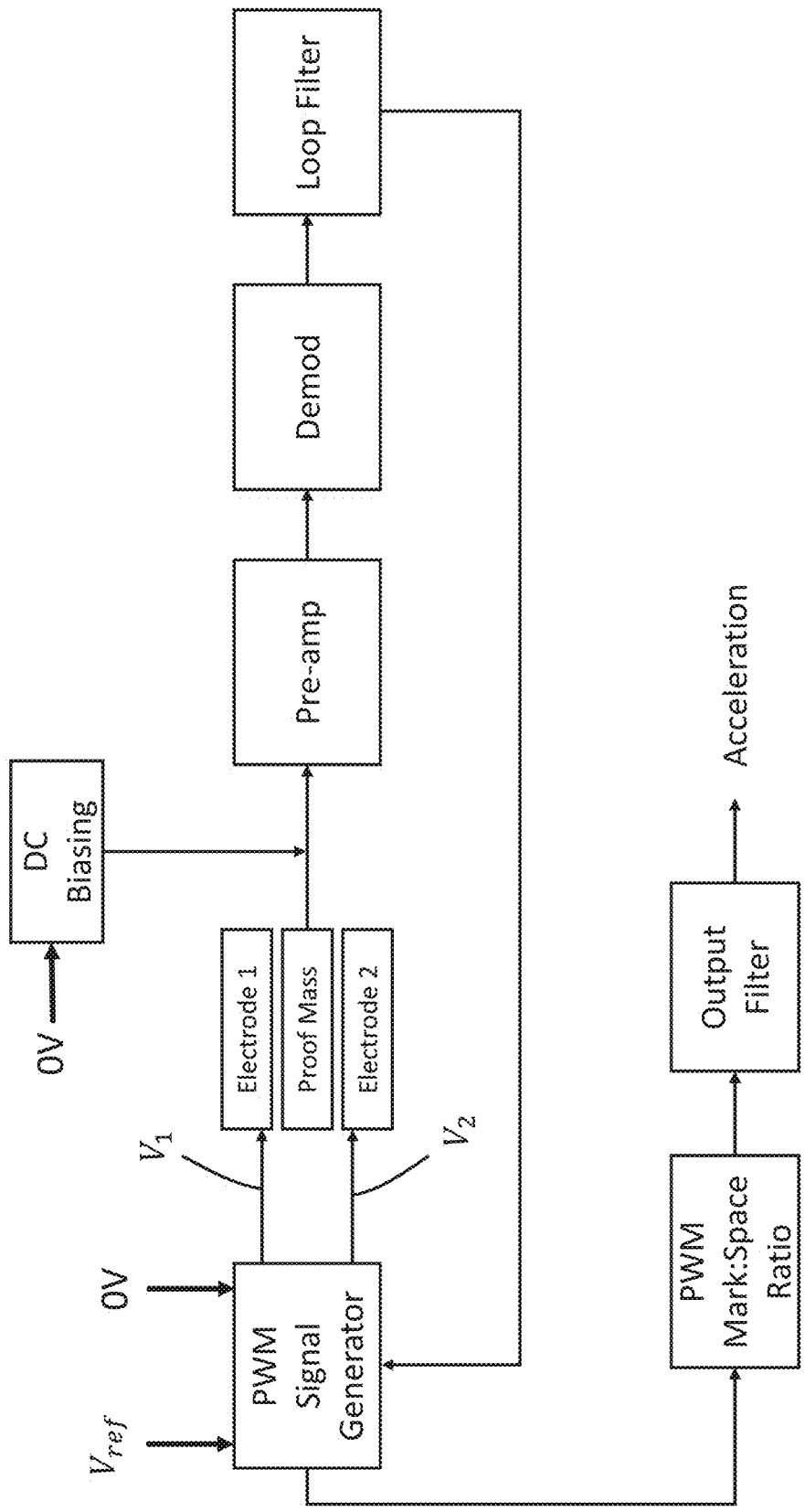
FIG. 1 schematically illustrates a known electronic control scheme for a closed loop capacitive accelerometer according to the prior art.

There is generally seen in FIG. 1 a known electronic control scheme for a closed loop capacitive accelerometer according to the prior art exemplified by U.S. Pat. No. 7,267,006, the contents of which are hereby incorporated by reference. A pulse width modulation (PWM) signal generator receives a constant fixed reference voltage $V_{ref}$ and supplies complementary first and second drive voltages $V_1$ and $V_2$ to electrode 1 and electrode 2. Electrodes 1 and 2 typically take the form of first and second sets of fixed capacitive electrode fingers that interdigitate with the moveable capacitive electrode fingers of the proof mass, as is well known in the art.

A pre-amplifier is arranged to sample an output signal at the proof mass. As illustrated in FIG. 1, the pre-amp is configured so that its input from the proof mass is a "virtual earth" where the voltage for the "earth" is 0 V, which is achieved by a DC biasing element such as a resistor. The pre-amp then forces the proof mass DC bias voltage to be the same as the reference voltage $V_{ref}$, whereas periodic signals are picked up by the pre-amp in response to movement of the proof mass. These periodic pick-off signals are then demodulated and passed through a loop filter before being fed back to a pulse width modulation (PWM) signal generator in closed loop operation.

Figure 2:
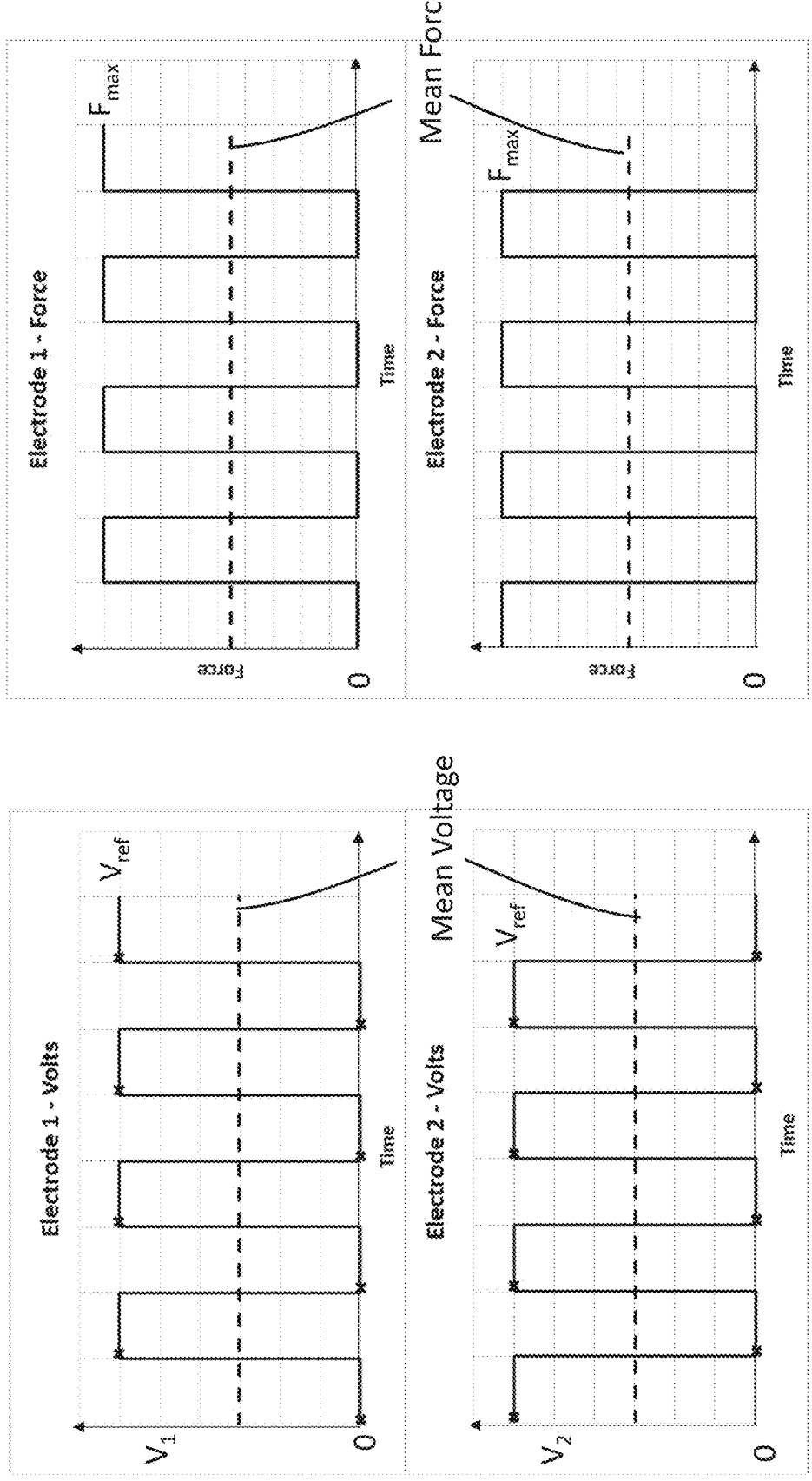
FIG. 2 shows the applied voltage waveforms and resultant electrostatic forces for electrodes 1 and 2, for a 50:50 mark:space ratio under a zero applied acceleration condition, according to the prior art.

FIG. 2 illustrates that the first and second drive signals have a standard square waveform varying in amplitude between zero and a maximum value $V_{ref}$ which is typically 30 V in order to give the force required to achieve a 70 g dynamic range. With zero applied acceleration, when the gaps d between the proof mass electrode and each of the two fixed electrodes are nominally equal, the waveforms consists of a square wave with a 50:50 mark:space ratio. The resultant force, F, for each electrode is given by:

$$F = \frac{CV^2}{d}$$

where C is the gap capacitance and V is the voltage. The mean voltage level for a 50:50 mark:space waveform, as shown by the dashed line, is equal to $V_{ref}/2$. The corresponding mean force will therefore similarly be half of the peak value, and is also shown as a dashed line in FIG. 2. As the fixed electrodes are located at opposite sides of the proof mass, the forces act in opposite directions and therefore, the net force acting on the proof mass will be zero. These waveforms are conveniently modulated at a very high frequency (e.g. $f_{mod}$~100 kHz) compared to the mechanical resonant frequency of the proof mass, which is critically damped, and therefore no significant motion occurs at this frequency.

Figure 3:
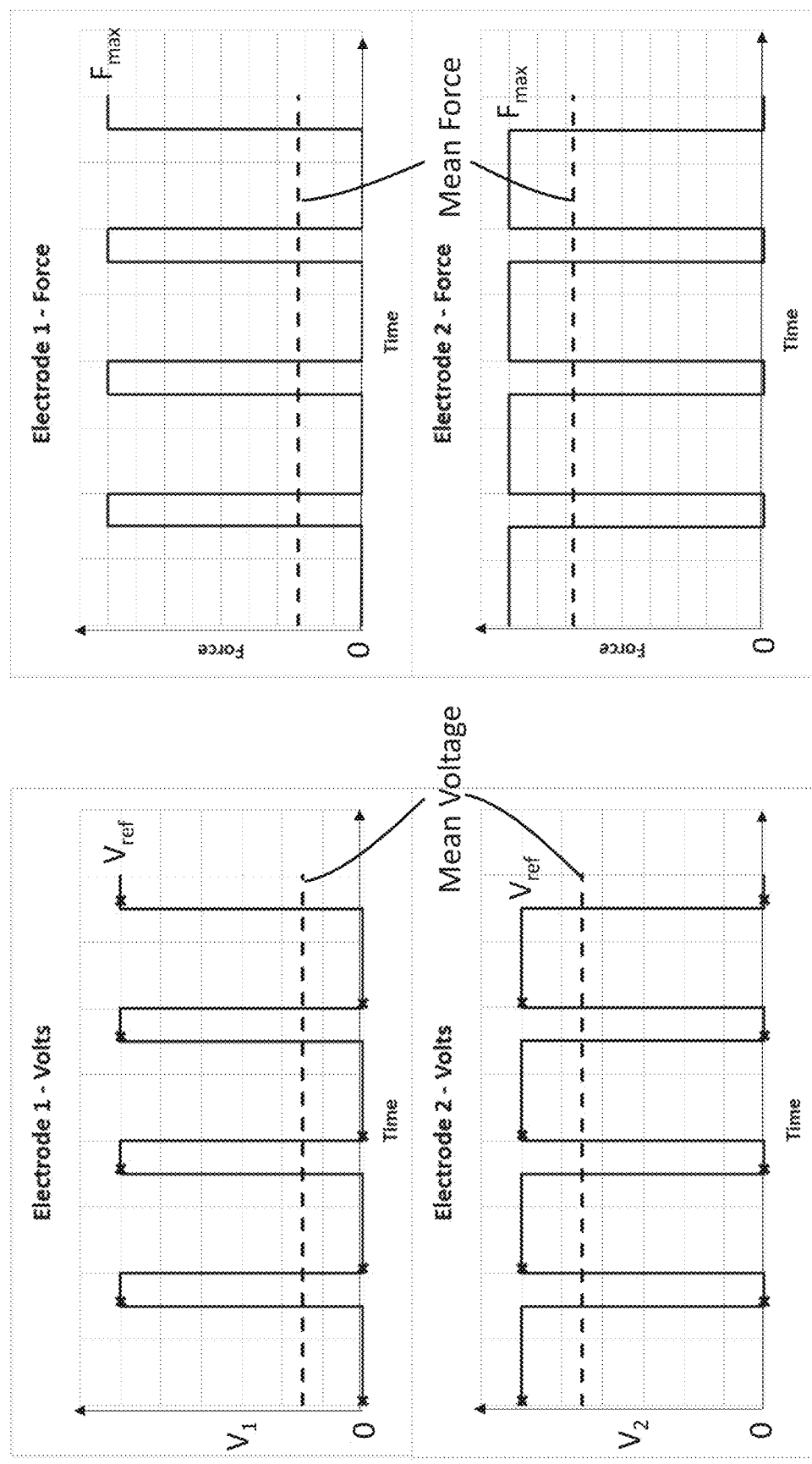
FIG. 3 shows the applied voltage waveforms and resultant electrostatic forces for electrodes 1 and 2, for a 25:75 mark:space ratio under a positive applied acceleration condition, according to the prior art.

When an acceleration is applied to the accelerometer, the signal generated by the displacement of the proof mass is fed back into the control loop which adjusts the mark:space ratio of the PWM signal. This differentially changes the forces between the fixed electrodes and proof mass to drive the proof mass back to the null position. The net force is given by:

$$F = V_{ref}^2 \left[ \frac{C_1 w_1}{2d_1} - \frac{C_2 w_2}{2d_2} \right]$$

Where $d_1$ and $d_2$ refer to the electrode 1 and 2 capacitor gaps respectively, and $w_1$ and $w_2$ are the pulse widths (i.e. voltage is at $V_{ref}$) for the two waveforms applied to the fixed electrodes. The waveforms and resultant forces for an exemplary positive acceleration, giving rise to a 25:75 mark:space ratio, are shown in FIG. 3. The reduced pulse width applied to electrode 1 results in a reduced mean voltage and thus a reduced mean force while the mean voltage and mean force increases for electrode 2. The mean net force on the proof mass is given by the differential force between electrodes 1 and 2. The individual mean force produced by each drive signal is non-linear, but the two operating together cancels the non-linearity and produces a net force which varies linearly with respect to the mark:space ratio.

In such a prior art capacitive accelerometer, dielectric charging arises due to the large mean DC voltages between the fixed electrodes and the proof mass. These voltage levels will also vary depending on the applied acceleration level thus changing the charging characteristics. In the control scheme of FIG. 1, applying a voltage level of 30 V for $V_{ref}$ results in a mean DC offset of 15 V between each of the fixed electrodes and the proof mass which generates large, opposing forces on the proof mass even when 0 g is applied. The mean voltage offsets will vary depending on the applied g level, however, large offsets will typically be present at all times in any practical application.

The Applicants have recognised that such dielectric charging can, however, be substantially eliminated by removing the mean voltage offset between the fixed electrodes and the proof mass. This may be achieved by firstly offsetting the proof mass voltage level to $V_{ref}/2$. The voltage waveforms will therefore vary symmetrically around the proof mass voltage level to give a mean zero offset between the proof mass and fixed electrodes. This eliminates the voltage gradients driving the charge migration and thus the problematic scale factor and bias drifts.

Figure 4:
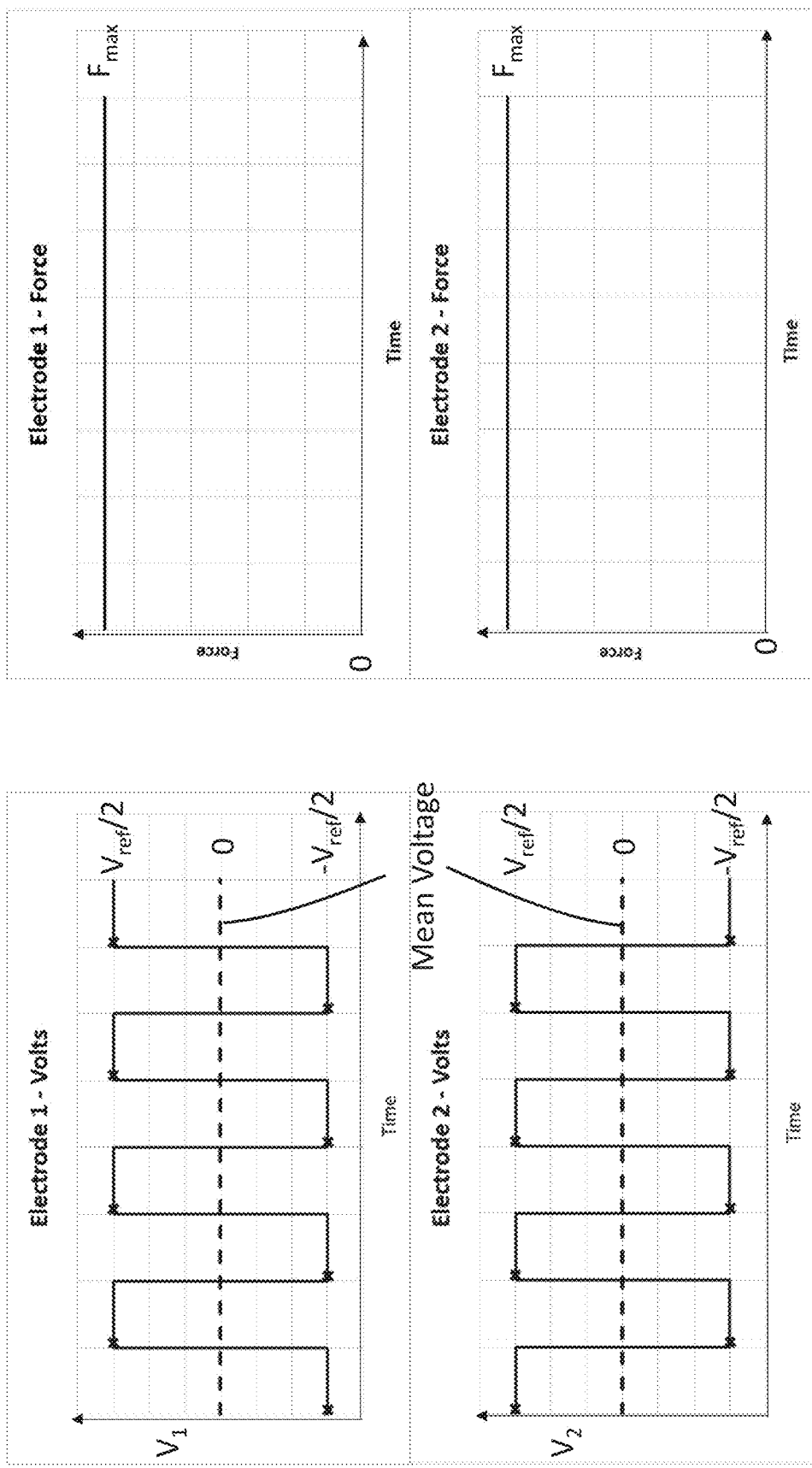
FIG. 4 shows the applied voltage waveforms and resultant electrostatic forces for electrodes 1 and 2, for a 50:50 mark:space ratio under a zero applied acceleration condition, with the proof mass referenced to $V_{ref}/2$.

However, the Applicants have realised that simply offsetting the proof mass voltage in the known control scheme of FIGS. 1-3 does not allow the necessary force feedback of closed loop operation to be achieved. FIG. 4 shows the effect of simply offsetting the proof mass voltage. It can be seen that, while the mean DC voltage is eliminated, the force, which varies as $V^2$, is rectified and thus positive and negative pulses produce identical forces of the same polarity. Varying the mark:space ratio does not therefore induce any change in the mean force and thus no force feedback can be applied.

Figure 5:
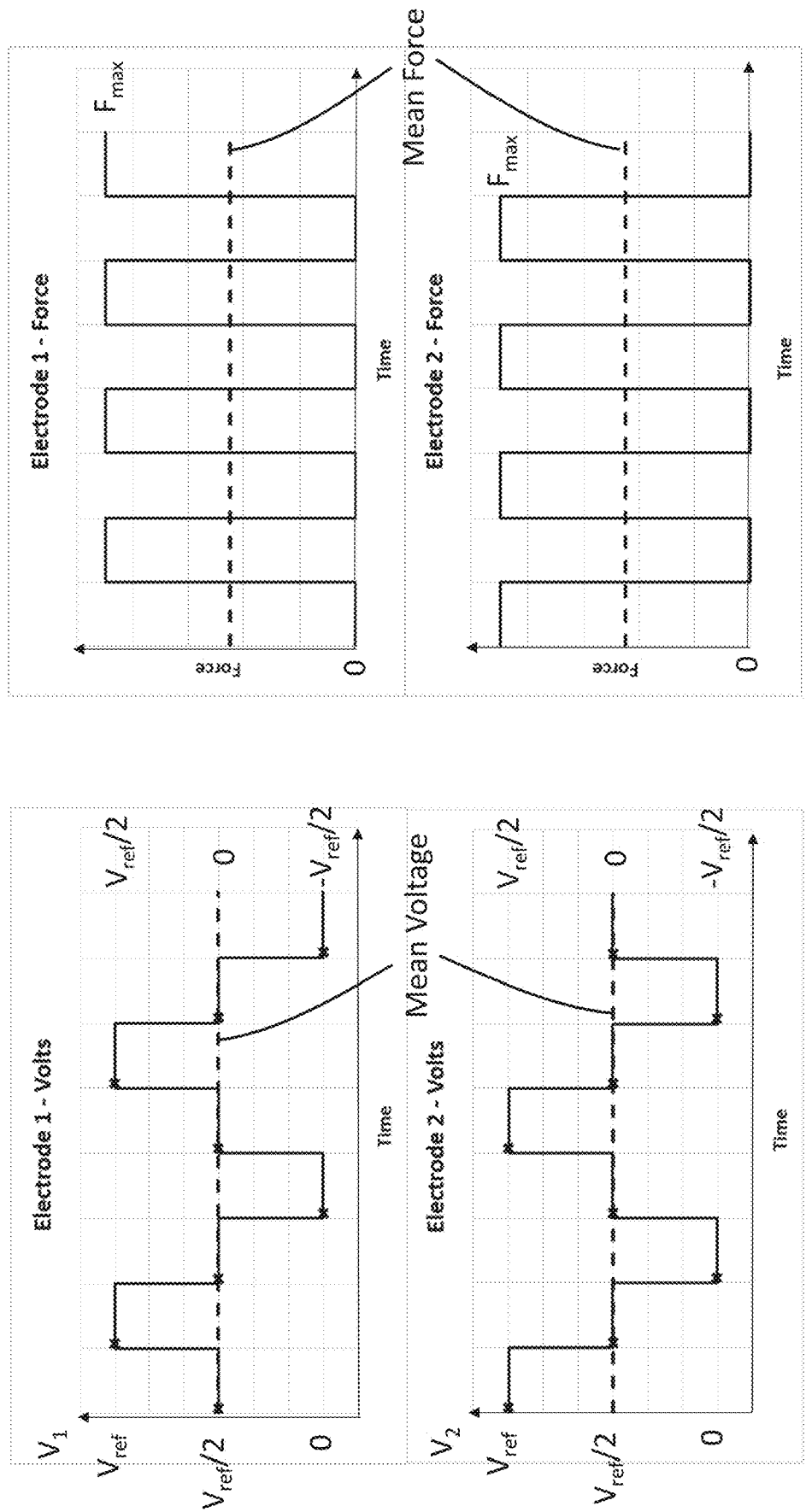
FIG. 5 shows the applied voltage waveforms and resultant electrostatic forces for electrodes 1 and 2, for a 50:50 mark:space ratio under a zero applied acceleration condition, according to examples of the present disclosure.

In examples according to the present disclosure, the drive signal waveforms are modified, as shown in FIG. 5, such that the mean forces can be adjusted by applying pulse width modulation. The electrode 1 voltage waveform $V_1$ steps between $V_{ref}/2$ and $V_{ref}$ in a first half cycle to give a first 'mark' with a positive pulse (with respect to the proof mass voltage), and steps between $V_{ref}/2$ and zero in a second half cycle to give a second negative pulse (with respect to the proof mass voltage). These pulses are separated by the 'space' at a voltage level of $V_{ref}/2$. The voltages relative to the proof mass are given on the right hand side of the plots for $V_1$ and $V_2$. The overall voltage change of 15 V seen by the proof mass is the same 30 V range that would have been applied in a prior art control scheme, but now there is a mean zero voltage as indicated by the dashed line. When comparing the waveforms of the prior art (FIG. 2) with those of an example of the present disclosure (FIG. 5), for identical timescales, the frequency, $f_{mod}$, of the waveform for the present disclosure will be at half that of the prior art. The temporal form of the resultant force, shown in FIG. 5, is at $2 \times f_{mod}$, due to the rectification of the positive and negative voltage cycles and is essentially identical to that of FIG. 2.

Figure 6:
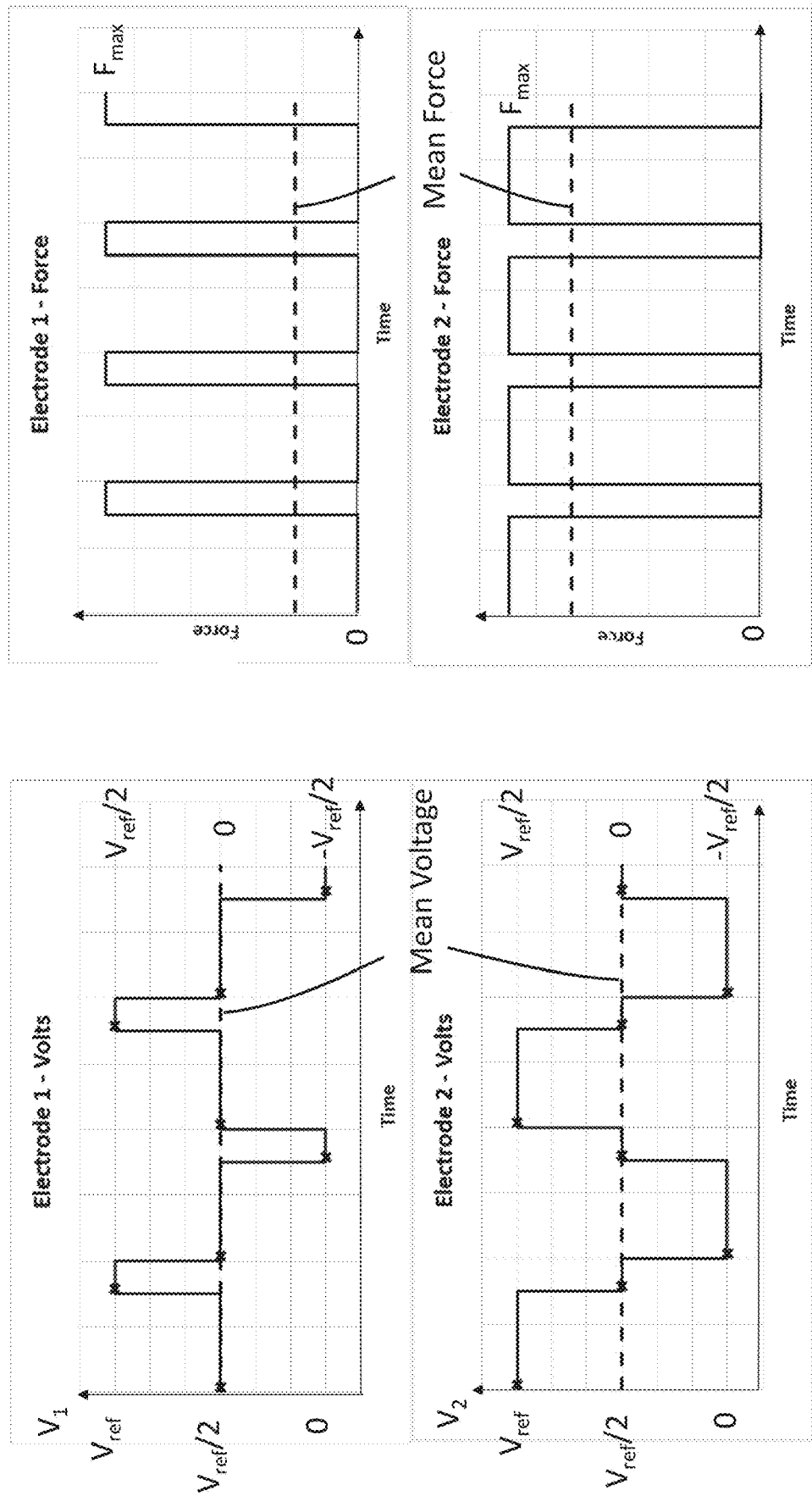
FIG. 6 shows the applied voltage waveforms and resultant electrostatic forces for electrodes 1 and 2, for a 25:75 mark:space ratio under a positive applied acceleration condition, according to examples of the present disclosure.

FIG. 6 shows the effect of adjusting the mark:space ratio to 25:75, where the pulse widths of the positive and negative cycles are adjusted identically, allowing the differential force to be adjusted whilst maintaining a zero mean voltage. As before, the electrode 1 voltage waveform $V_1$ steps between $V_{ref}/2$ and $V_{ref}$ in a first half cycle to give a first 'mark' with a positive pulse (with respect to the proof mass voltage), and steps between $V_{ref}/2$ and zero in a second half cycle to give a second negative pulse (with respect to the proof mass voltage), albeit the marks are shorter in time. The mark:space ratio of 25:75 produces a differential force between electrodes 1 and 2 and hence a net electrostatic restoring force on the proof mass for balancing the inertial force of the applied acceleration and maintaining the proof mass at a null position. The voltages relative to the proof mass are given on the right hand side of the plots for $V_1$ and $V_2$. Again, the resultant force temporal form is identical to that shown in FIG. 3.

In the example seen in FIGS. 5-6, the mean drive force $F \propto (V_{ref}/2)^2$ so this control scheme reduces the drive force by a factor of ×4. This limits the overall g range for a given accelerometer unless a larger voltage range is applied. However, many high precision applications do not require a large g range. The g range may however be increased by increasing the value of $V_{ref}$, if required.

Figure 7:
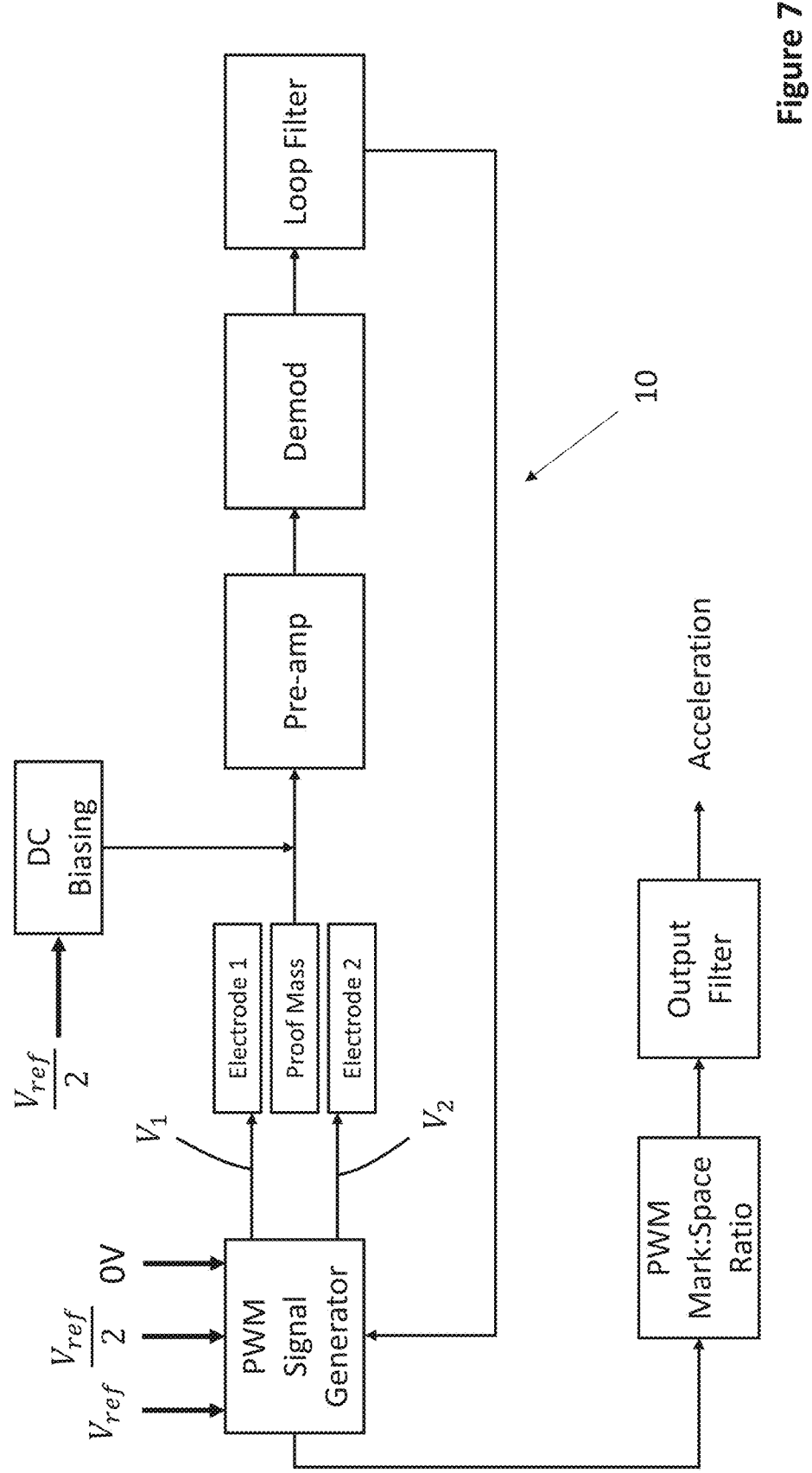
FIG. 7 schematically illustrates an electronic control scheme for a closed loop capacitive accelerometer according to examples of the present disclosure.

FIG. 7 shows a block diagram of an exemplary means to implement the disclosed method for closed loop operation of a capacitive accelerometer, i.e. a force feedback control scheme. A pulse width modulation (PWM) signal generator is supplied with voltages $V_{ref}$, $V_{ref}/2$ and 0 V and outputs electrode voltages waveforms $V_1$ and $V_2$, shown in FIGS. 5 and 6, to electrodes 1 and 2 respectively. The signal from the proof mass is applied to a pre-amplifier which is referenced to $V_{ref}/2$ via a DC biasing element (which may e.g. consist of a resistor), which offsets the proof mass reference voltage to the same level. This differs from the prior art where the proof mass is referenced to 0 V, as shown in FIG. 1. The pre-amplifier output is demodulated, and applied to a loop filter which integrates the signal and sets the dynamic response of the system with the output used to control the PWM signal generator to adjust the mark:space ratio. The pre-amplifier, demodulator, loop filter and feedback to the PWM signal generator form a closed loop circuit 10.

Figure 8:
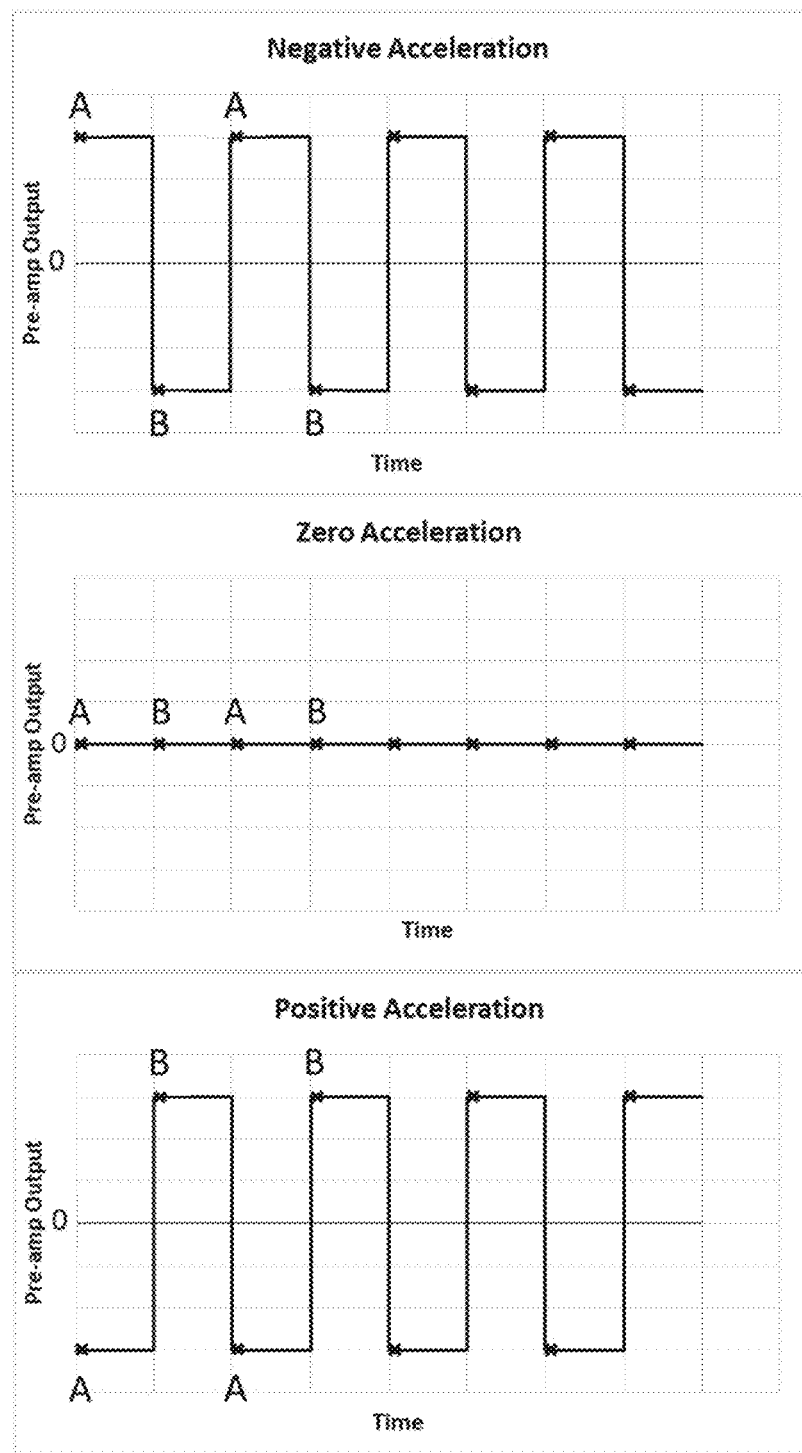
FIG. 8 shows the pre-amplifier voltage output signals and sampling points, for an open loop accelerometer under positive, zero and negative applied acceleration conditions, according to the prior art.

There are significant differences between examples of the present disclosure and the prior art control scheme described in U.S. Pat. No. 7,267,006, in terms of the signal detected by the pre-amplifier and its subsequent demodulation. For the previous scheme of FIG. 1, the AC signal detected by the pre-amplifier (in an open loop accelerometer configuration) is shown schematically in FIG. 8. For example, when a positive acceleration is applied, the electrode 1 signal will be larger than the electrode 2 signal due to the differential gap change. FIG. 8 shows the resultant signal for positive, zero and negative applied accelerations. The rising and falling edges of the drive waveform $V_1$ are used to trigger the signal sampling which takes place after a fixed delay to avoid any signal transients arising from the input waveform. The sampling points are shown by the crosses in FIG. 8. The corresponding points on the drive waveform $V_1$ are shown in FIGS. 2-3. The delay is conveniently set to equal approximately 5 percent of the pulse duration which, for an exemplary 100 kHz modulation frequency, $f_{mod}$, is equivalent to a 0.25 micro-second delay. A limitation of 5%:95%<mark:space<95%:5% is set to ensure that no switching occurs during the sampling period. The acceleration signal is derived from the difference in the levels between Samples A and Samples B as follows:

Acceleration Signal=(Sample $A$–Sample $B$)

Figure 9:
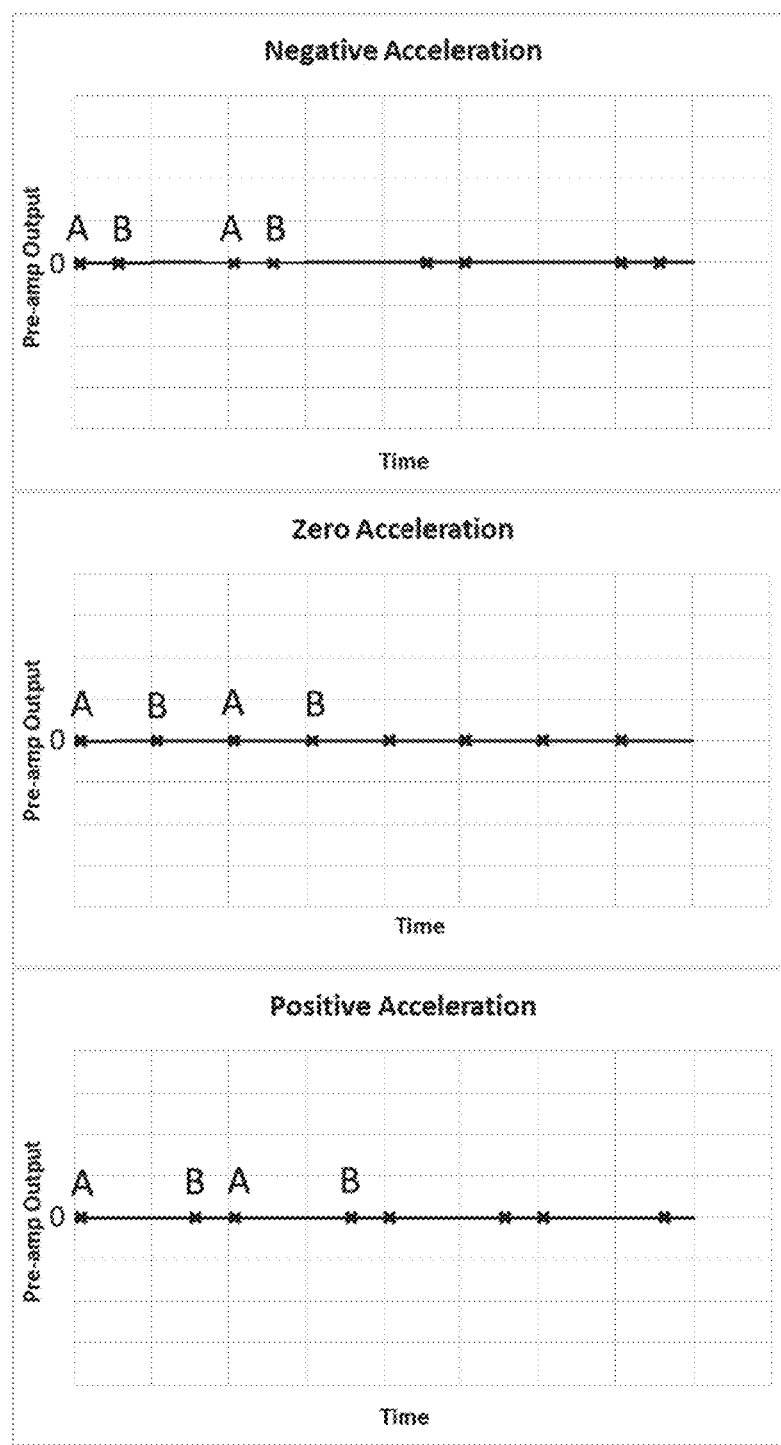
FIG. 9 shows the pre-amplifier voltage output signals and sampling points, for a closed loop accelerometer under positive, zero and negative applied acceleration conditions, according to the prior art.

In closed loop operation this AC signal is used to adjust the mark:space ratio in order to achieve a null at the input to the pre-amplifier. The waveforms shown in FIG. 8 would therefore be modified such that the pre-amplifier output is maintained at zero at all times. The sampling points would however vary in accordance with the rising and falling edges of the drive waveform, which is now subject to pulse width modulation at a variable mark:space ratio. The pre-amplifier output and corresponding sample points for a closed loop configuration are shown in FIG. 9. The corresponding points on the drive waveform $V_1$ are shown in FIGS. 2-3, with FIG. 2 (50:50) representing zero acceleration and FIG. 3 (25:75) representing positive and negative accelerations.

Figure 10:
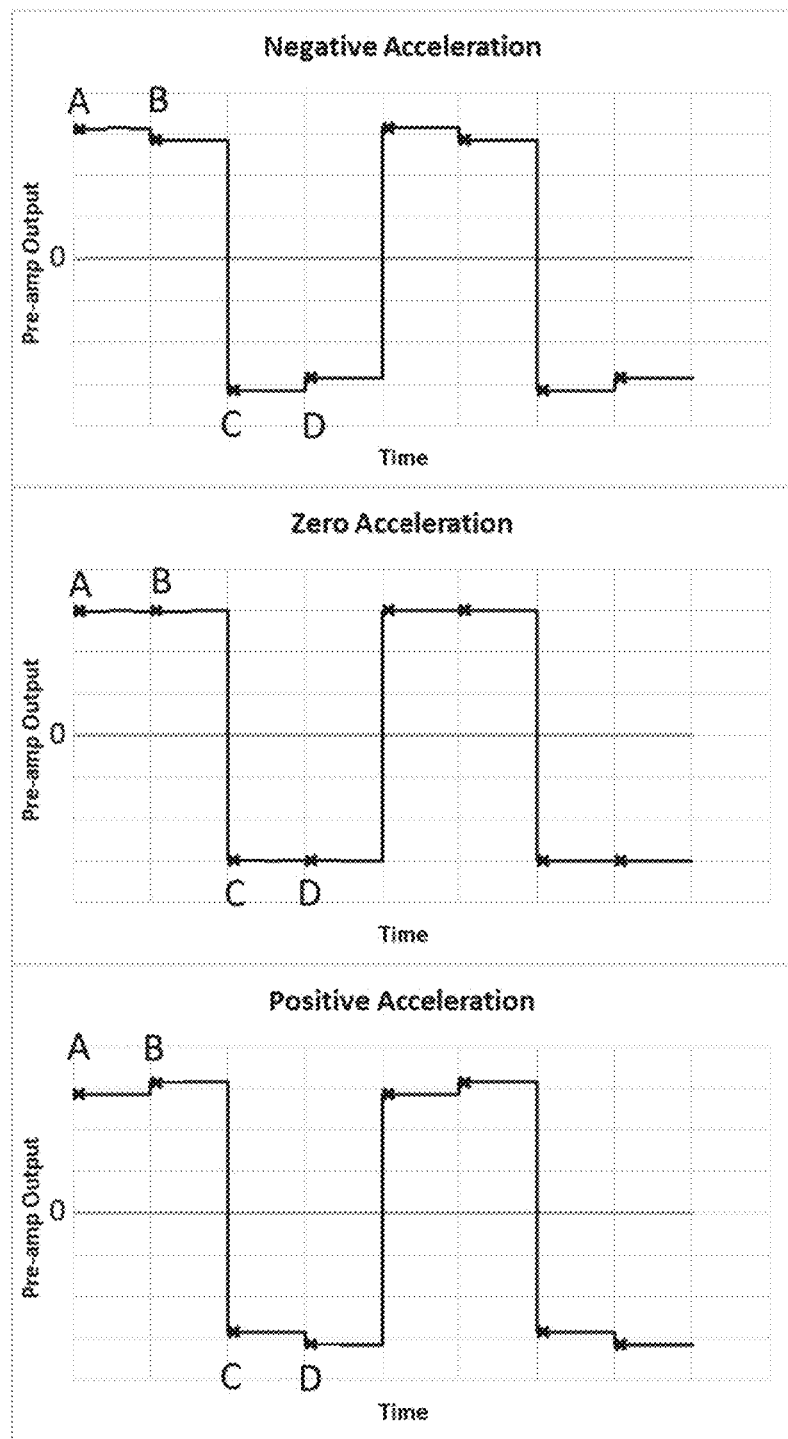
FIG. 10 shows the pre-amplifier voltage output signals and sampling points, for an open loop accelerometer under positive, zero and negative applied acceleration conditions, according to examples of the present disclosure.

The corresponding open loop AC signals measured by the pre-amplifier for examples of the present disclosure, for positive, zero and negative applied accelerations, are shown in FIG. 10. It can be seen that, even at zero applied acceleration, a large AC signal exists at $f_{mod}$. For this implementation, with the displacement of the proof mass induced by a positive acceleration, the sample A level will give a smaller positive value than that for the sample B. For the next two samples, the sample C level will be a smaller negative value than that for sample D. The acceleration signal is derived by summing the samples as follows:

Acceleration Signal=(Sample $A$–Sample $B$)–(Sample $C$–Sample $D$)

For a negative acceleration, the polarity of the resultant acceleration signal will be reversed. This process enables the acceleration signal to be extracted despite the presence of the large AC background signal. In other words, the acceleration signal appears as a relatively small perturbation superimposed on the background (zero acceleration) signal. For an open loop accelerometer this provides a direct measurement of the acceleration, however, in closed loop operation this signal is used to adjust the mark:space ratio such that the input acceleration signal is nulled.

Figure 11:
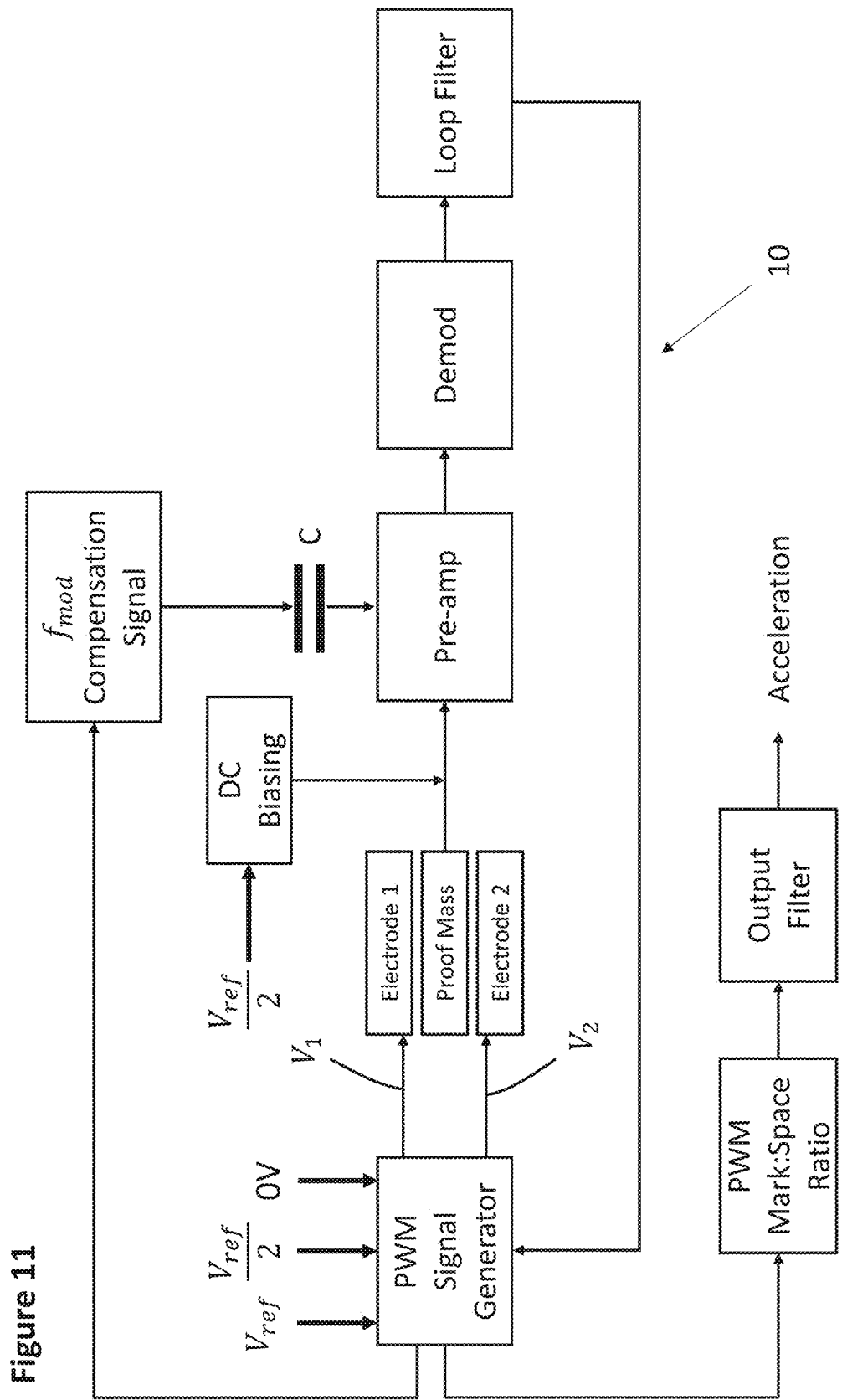
FIG. 11 schematically illustrates an alternative electronic control scheme for a closed loop capacitive accelerometer according to further examples of the present disclosure.
Figure 12:
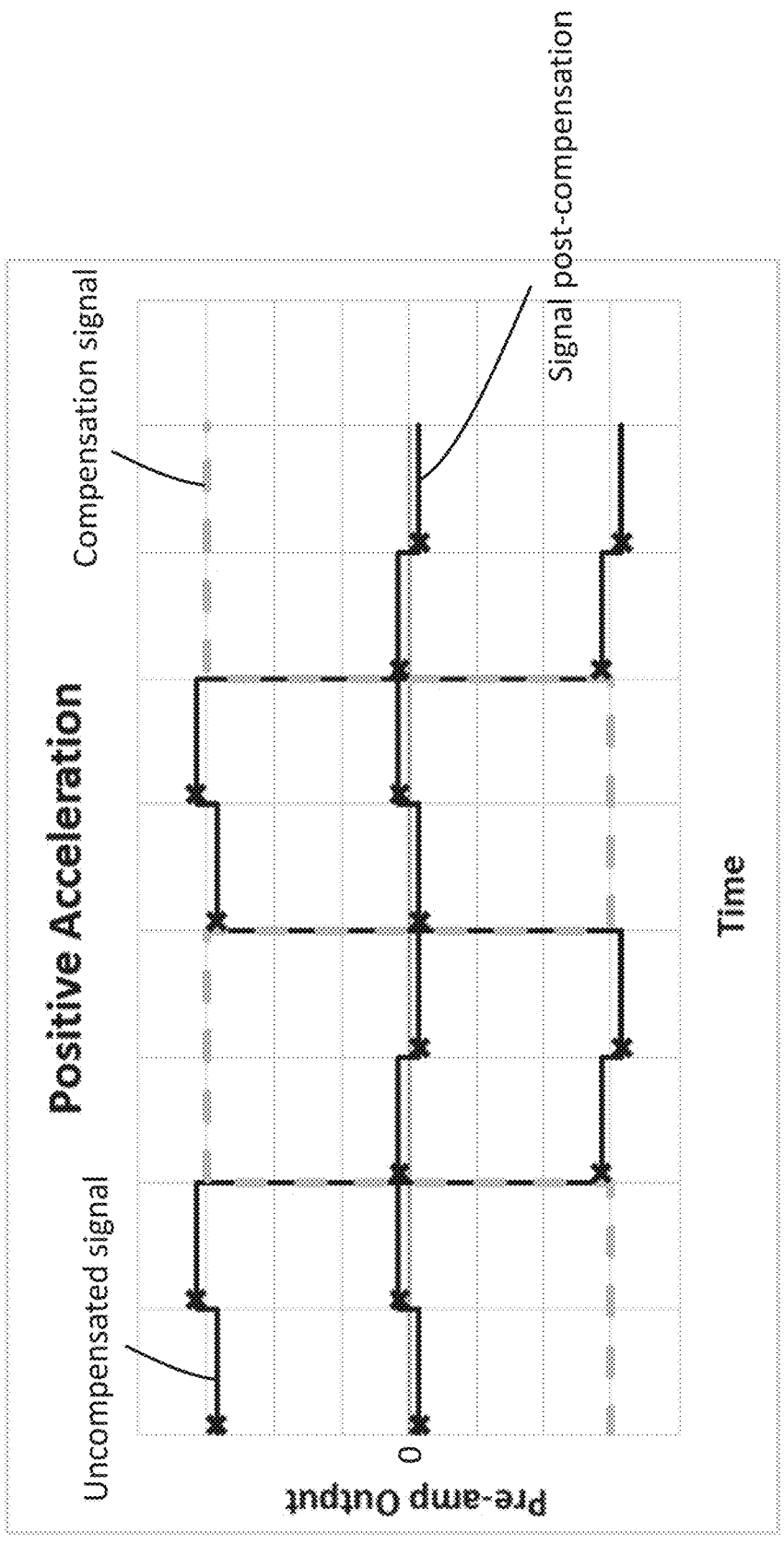
FIG. 12 shows the pre-amplifier voltage output signals and sampling points, both before and after application of a compensating signal, for an open loop accelerometer under positive applied acceleration conditions, according to examples of the present disclosure.

The large AC waveform shown in FIG. 10 at $f_{mod}$ is superimposed on the smaller acceleration-induced signal variation. This large signal input to the pre-amplifier may be problematic as it limits the gain which may be applied in order to avoid saturation. This limitation can be overcome by summing an anti-phased compensation signal input to the pre-amplifier of equal amplitude. This may be implemented as shown schematically in FIG. 11. The capacitive accelerometer is basically the same as already described in relation to FIG. 7, except that in this example a square wave compensation signal (at $f_{mod}$) is additionally produced by the PWM signal generator which varies between $V_{ref}/2$ and $-V_{ref}/2$. This ensures that the timing and amplitude of the compensation signal are accurately synchronised with the drive signal waveforms applied to electrodes 1 and 2. The compensation signal is applied to a fixed "compensation" capacitor C which has a capacitance substantially of equal value to the gap capacitance of electrodes 1 and 2, with the signal from the capacitor C then applied to the pre-amplifier input. The compensation signal received at the input to the pre-amplifier is then substantially of equal amplitude but of opposite phase to the signal input from the proof mass electrode. FIG. 12 shows the effect of the compensation for an exemplary case with a positive applied acceleration. The uncompensated signal shows a large peak to peak variation of which only a small component is due to the applied acceleration. After application of the compensation signal (dashed line), the variation is significantly reduced. For an exactly matched compensation signal, the resultant output signal will contain only components arising due to the applied acceleration.

Figure 13:
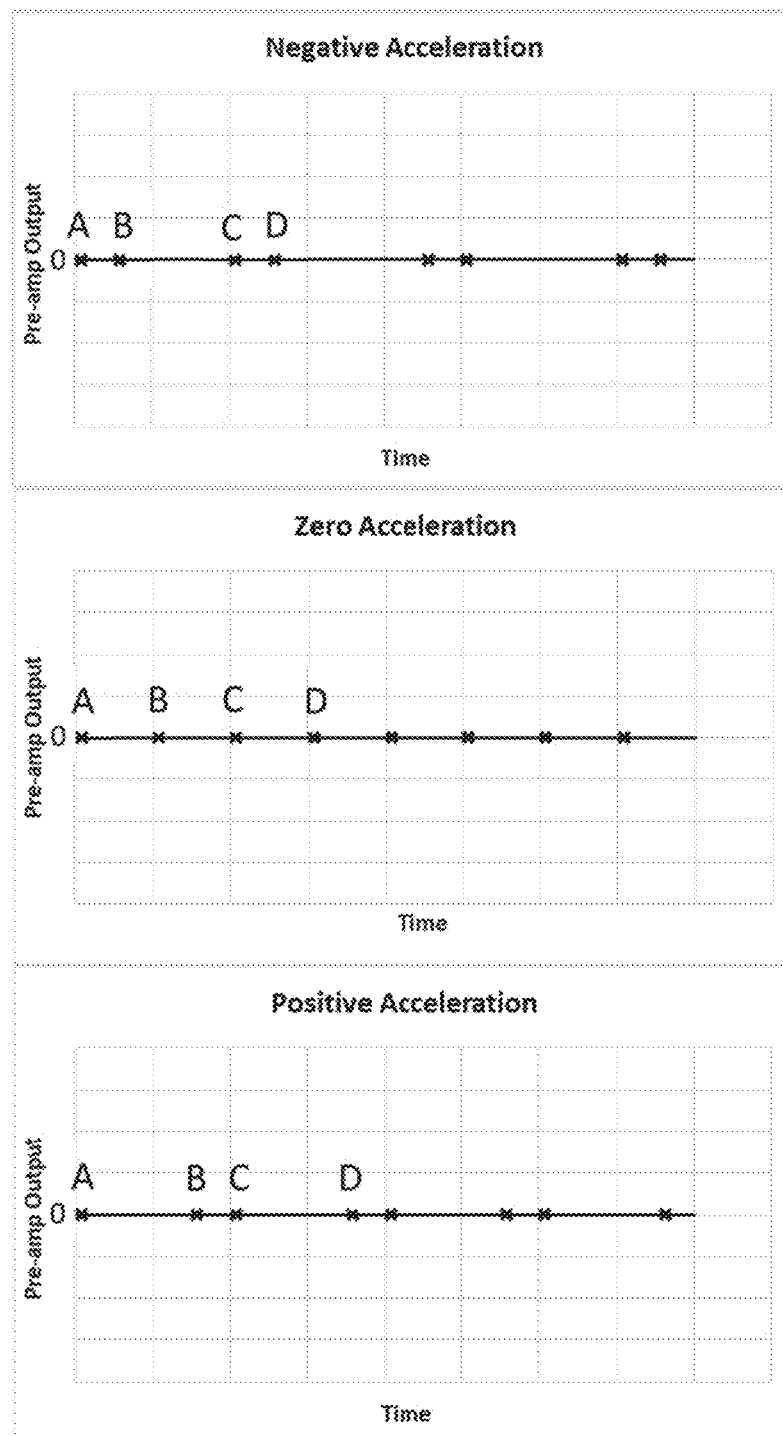
FIG. 13 shows the pre-amplifier voltage output signals and sampling points, for a closed loop accelerometer under positive, zero and negative applied acceleration conditions, according to further examples of the present disclosure.

When operated in a closed loop mode and with the compensation signal applied, the pre-amplifier output waveforms shown in FIG. 10 for open loop will be modified as shown in FIG. 13. This enables the gain of the pre-amplifier to be set substantially higher than would be possible in the absence of the compensation signal, thus providing a significant improvement in the measurement resolution and hence in the sensitivity and noise performance of the accelerometer.

The proof mass and fixed capacitive electrodes may have any suitable arrangement in a capacitive accelerometer as generally disclosed herein. For example, the proof mass may be moveable in a pendulous or hinged structure. EP0338688 provides an applicable example of a moveable proof mass electrode formed at the tip of a silicon cantilever and fixed electrodes arranged to oppose the moveable electrode. However, in some preferred examples the proof mass is planar and comprises moveable electrodes fingers that interdigitate with fixed electrode fingers extending from the first and second fixed capacitive electrodes. Such an interdigitated or comb-like electrode structure is well-known in the art, for example as disclosed in any of U.S. Pat. Nos. 6,761,069, 6,631,643, or U.S. Pat. No. 7,267,006, the contents of each of which are hereby incorporated by reference.

Figure 14:
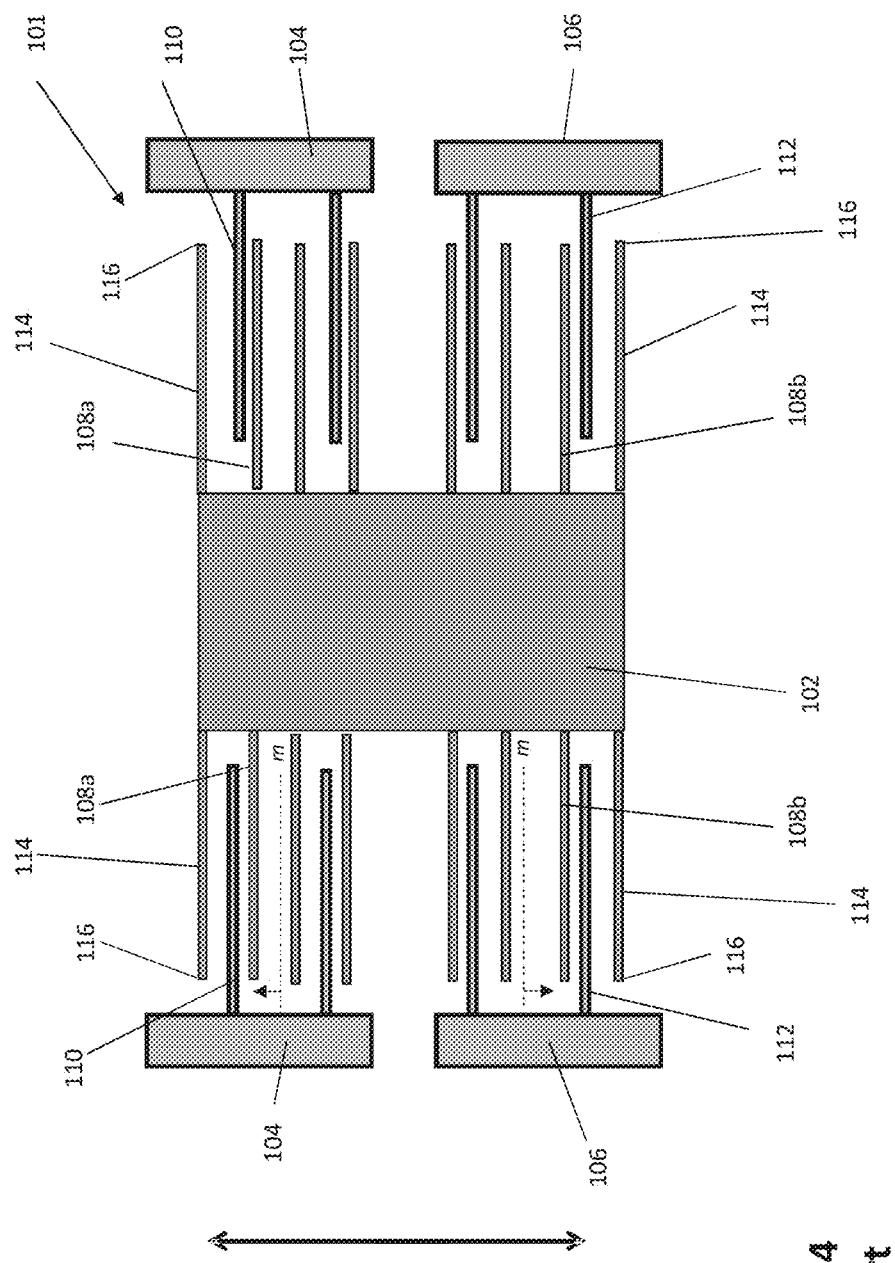
FIG. 14 is a schematic representation of an exemplary electrode arrangement in a capacitive accelerometer.

An exemplary electrode structure for a capacitive accelerometer 101 is schematically illustrated in FIG. 14, which is similar to that described in U.S. Pat. No. 7,267,006. In this example, the proof mass 102 is substantially planar and mounted to a fixed substrate (not seen) by flexible support legs 114 so as to be linearly moveable in a plane along the sensing axis (as indicated by the double-headed arrow) in response to an applied acceleration. The flexible support legs 114 extend from the body of the proof mass 102 and are fixed at anchor points 116 to the fixed substrate.

First and second fixed capacitive electrodes 104, 106 are formed in the fixed substrate in the same plane. The proof mass 102 comprises first and second sets of moveable capacitive electrode fingers 108 extending from the proof mass 102, substantially perpendicular to the sensing axis and spaced apart along the sensing axis. It may also be seen that the first and second fixed capacitive electrodes 104, 106 comprise, respectively, first and second sets of fixed capacitive electrode fingers 110, 112 extending substantially perpendicular to the sensing axis and spaced apart along the sensing axis. The first set of fixed capacitive electrode fingers 110 is arranged to interdigitate with the first set of moveable capacitive electrode fingers 108a with a first offset in one direction along the sensing axis from a median line m between adjacent fixed capacitive electrode fingers 110, and the second set of fixed capacitive electrode fingers 112 is arranged to interdigitate with the second set of moveable capacitive electrode fingers 108b with a second offset in the opposite direction along the sensing axis from a median line m between adjacent fixed capacitive electrode fingers 112.

The proof mass 102 can move in-plane relative to the fixed electrodes 104, 106 in a direction along the sensing axis in response to an applied acceleration. As the two sets of fixed electrode fingers 110, 112 are offset from the proof mass fingers 108a, 108b in opposite directions, a movement in either direction can be measured. These offsets may be equal in size. The difference in offset for the first set of fixed electrode fingers 110 and the second set of fixed electrode fingers 112 relative to the moveable fingers 108a, 108b causes an attractive force when a drive signal (e.g. voltage waveform) is applied to the first and second sets of fixed electrode fingers 110, 112.

In open loop operation, movement of the proof mass 102 in response to an applied acceleration causes a change in the offset between the proof mass fingers 108a, 108b and the fixed electrode fingers 110, 112. This change can be used to calculate the acceleration, as it will cause a change in differential capacitance. In closed loop operation, the interdigitated electrode fingers do not actually move relative to one another. Applying pulse width modulation (PWM) to the first and second drive signals applied to the first and second fixed capacitive electrodes 104, 106, an electrostatic restoring force acts on the proof mass fingers 108a, 108b so that under acceleration the proof mass 102 does not move from the null position seen in FIG. 14, with the inertial force of the applied acceleration being balanced by a net electrostatic restoring force.

It will be appreciated by those skilled in the art that the disclosure has been illustrated by describing one or more specific examples thereof, but is not limited to these aspects; many variations and modifications are possible, within the scope of the accompanying claims.

The invention claimed is:

1. A method for closed loop operation of a capacitive accelerometer, the capacitive accelerometer comprising:
   a proof mass moveable along a sensing axis in response to an applied acceleration; and
   first and second fixed capacitive electrodes arranged symmetrically either side of the proof mass along the sensing axis with a gap defined between each of the first and second fixed capacitive electrodes and the proof mass under zero applied acceleration;
   the method comprising:
   applying a first drive signal $V_1$ to the first fixed capacitive electrode and a second drive signal $V_2$ to the second fixed capacitive electrode, the first and second drive signals each having a periodic waveform varying in amplitude between zero and a maximum value $V_{ref}$; and
   sensing a displacement of the proof mass and applying pulse width modulation to the first and second drive signals with a constant frequency $f_{mod}$ and a variable mark/space ratio so as to provide a net electrostatic restoring force on the proof mass for balancing the inertial force of the applied acceleration and maintaining the proof mass at a null position;
   applying a voltage offset $V_{ref}/2$ to the proof mass; and
   applying the pulse width modulation such that the first and second drive signals have a waveform that varies so that when either one of the first and second drive signals is at $V_{ref}$ or zero the other drive voltage is at $V_{ref}/2$.

2. The method of claim 1, wherein the first and second drive signals have a waveform that steps between $V_{ref}/2$ and $V_{ref}$ in a first half cycle and steps between $V_{ref}/2$ and zero in a second half cycle.

3. The method of claim 1, wherein the first and second drive signals have a waveform that comprises a single square wave pulse in the first half cycle and a single square wave pulse in the second half cycle that is inverted about $V_{ref}/2$ relative to the single square wave pulse in the first half cycle.

4. The method of claim 1, wherein applying a voltage offset $V_{ref}/2$ to the proof mass comprises referencing the proof mass to an electrical connection midway between the first and second fixed capacitive electrodes.

5. The method of claim 1, further comprising:
   sensing a displacement of the proof mass by sampling an output signal at the proof mass; and
   adding a compensation signal to the output signal, the compensation signal having the same pulse width modulation with a constant frequency $f_{mod}$, and the compensation signal being in anti-phase with the output signal.

6. The method of claim 5, further comprising:
   applying the compensation signal across a compensation capacitor having a capacitance substantially matched to the capacitance of the gap between each of the first and second fixed capacitive electrodes and the proof mass under zero applied acceleration.

7. The method of claim 1, further comprising:
outputting a signal indicative of the applied acceleration.

8. The method of claim 1, wherein the capacitive accelerometer comprises a silicon MEMS structure and/or wherein the proof mass is substantially planar.

9. The method of claim 1, wherein the proof mass is mounted to a fixed substrate by flexible support legs so as to be linearly moveable in a plane along the sensing axis in response to an applied acceleration, and wherein the first and second fixed capacitive electrodes are formed in the fixed substrate in the same plane.

10. The method of claim 1, wherein:
the proof mass comprises first and second sets of moveable capacitive electrode fingers extending from the proof mass, substantially perpendicular to the sensing axis and spaced apart along the sensing axis; and
the first and second fixed capacitive electrodes comprise, respectively, first and second sets of fixed capacitive electrode fingers extending substantially perpendicular to the sensing axis and spaced apart along the sensing axis; and
the first set of fixed capacitive electrode fingers is arranged to interdigitate with the first set of moveable capacitive electrode fingers with a first offset in one direction along the sensing axis from a median line between adjacent fixed capacitive electrode fingers, and the second set of fixed capacitive electrode fingers is arranged to interdigitate with the second set of moveable capacitive electrode fingers with a second offset in the opposite direction along the sensing axis from a median line between adjacent fixed capacitive electrode fingers.

11. A capacitive accelerometer comprising:
a proof mass moveable along a sensing axis in response to an applied acceleration;
first and second fixed capacitive electrodes arranged symmetrically either side of the proof mass along the sensing axis with a gap defined between each of the first and second fixed capacitive electrodes and the proof mass under zero applied acceleration;
a pulse width modulation signal generator arranged to apply a first drive signal $V_1$ to the first fixed capacitive electrode and a second drive signal $V_2$ to the second fixed capacitive electrode, the first and second drive signals each having a periodic waveform varying in amplitude between zero and a maximum value $V_{ref}$; and
a closed loop circuit arranged to detect a signal resulting from displacement of the proof mass and control the pulse width modulation signal generator to apply the first and second drive signals at a constant frequency $f_{mod}$ with a variable mark/space ratio so as to provide a net electrostatic restoring force on the proof mass for balancing the inertial force of the applied acceleration and maintaining the proof mass at a null position;
characterised in that:
a voltage offset $V_{ref}/2$ is applied to the proof mass; and
the first and second drive signals have a waveform that varies so that when either one of the first and second drive signals is at $V_{ref}$ or zero the other drive voltage is at $V_{ref}/2$.

12. The capacitive accelerometer of claim 11, wherein the proof mass is referenced to an electrical connection midway between the first and second fixed capacitive electrodes.

13. The capacitive accelerometer of claim 11, further comprising:
a pre-amplifier arranged to sample an output signal at the proof mass; wherein the pulse width modulation signal generator is arranged to input a compensation signal to the pre-amplifier for the pre-amplifier to add to the output signal, the compensation signal having the same pulse width modulation with a constant frequency $f_{mod}$, and the compensation signal being in anti-phase with the output signal.

14. The capacitive accelerometer of claim 13, further comprising:
a compensation capacitor connected between the pulse width modulation signal generator and the pre-amplifier, the compensation capacitor having a capacitance substantially matched to the capacitance of the gap between each of the first and second fixed capacitive electrodes and the proof mass under zero applied acceleration.

15. The capacitive accelerometer of claim 11, comprising a silicon MEMS structure.

16. The capacitive accelerometer of claim 11, wherein the proof mass is mounted to a fixed substrate by flexible support legs so as to be linearly moveable in a plane along the sensing axis in response to an applied acceleration, and wherein the first and second fixed capacitive electrodes are formed in the fixed substrate in the same plane.

17. The capacitive accelerometer of claim 11, wherein proof mass is substantially planar.

18. The capacitive accelerometer of claim 11,
wherein the proof mass comprises first and second sets of moveable capacitive electrode fingers extending from the proof mass, substantially perpendicular to the sensing axis and spaced apart along the sensing axis;
wherein the first and second fixed capacitive electrodes comprise, respectively, first and second sets of fixed capacitive electrode fingers extending substantially perpendicular to the sensing axis and spaced apart along the sensing axis; and
wherein the first set of fixed capacitive electrode fingers is arranged to interdigitate with the first set of moveable capacitive electrode fingers with a first offset in one direction along the sensing axis from a median line between adjacent fixed capacitive electrode fingers, and the second set of fixed capacitive electrode fingers is arranged to interdigitate with the second set of moveable capacitive electrode fingers with a second offset in the opposite direction along the sensing axis from a median line between adjacent fixed capacitive electrode fingers.

19. The capacitive accelerometer of claim 18, wherein the proof mass is mounted to a fixed substrate by flexible support legs so as to be linearly moveable in a plane along the sensing axis in response to an applied acceleration, and wherein the first and second fixed capacitive electrodes are formed in the fixed substrate in the same plane.

20. The capacitive accelerometer of claim 19, wherein the proof mass is substantially planar.

* * * * *